(12) United States Patent
Jennas, II et al.

(10) Patent No.: US 10,073,978 B2
(45) Date of Patent: Sep. 11, 2018

(54) EFFICIENT MODIFICATION AND CREATION OF AUTHORIZATION SETTINGS FOR USER ACCOUNTS

(71) Applicant: INTERNATIONAL BUSINESS MACHINES CORPORATION, Armonk, NY (US)

(72) Inventors: Paul A. Jennas, II, Tucson, AZ (US); Jason L. Peipelman, Vail, AZ (US); Cory Thorpe, San Diego, CA (US); Chris Zukowski, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 14/254,493

(22) Filed: Apr. 16, 2014

(65) Prior Publication Data
US 2015/0302189 A1    Oct. 22, 2015

(51) Int. Cl.
*G06F 21/00* (2013.01)
*G06F 21/60* (2013.01)

(52) U.S. Cl.
CPC .................... *G06F 21/604* (2013.01)

(58) Field of Classification Search
CPC ..... G06F 21/36; G06F 21/6218; G06F 21/604
See application file for complete search history.

(56) References Cited

U.S. PATENT DOCUMENTS

| | | | |
|---|---|---|---|
| 5,226,163 A * | 7/1993 | Karsh | ............... G06F 17/30067 |
| 8,434,128 B2 | 4/2013 | Kennedy | |
| 8,955,148 B1 * | 2/2015 | Biegala et al. | ................. 726/27 |
| 2009/0276445 A1 * | 11/2009 | Flake et al. | .................... 707/100 |
| 2009/0292997 A1 * | 11/2009 | Bell | ........................ H04L 41/22 715/738 |
| 2011/0231443 A1 | 9/2011 | Hannel et al. | |
| 2011/0246444 A1 | 10/2011 | Jenkins et al. | |
| 2011/0289553 A1 | 11/2011 | Carter et al. | |
| 2012/0167197 A1 | 6/2012 | Kruger et al. | |
| 2013/0212484 A1 * | 8/2013 | Joshi | ....................... G06F 9/541 715/740 |
| 2013/0269020 A1 | 10/2013 | Griffin et al. | |

FOREIGN PATENT DOCUMENTS

EP    1939707 A1    7/2008

OTHER PUBLICATIONS

Smetters et al., "How Users Us Access Control" Jul. 2009, Symposium on Usable Privacy and Security (SOUPS).

\* cited by examiner

*Primary Examiner* — Kendall Dolly
(74) *Attorney, Agent, or Firm* — Griffiths & Seaton PLLC (57) ABSTRACT

For efficient authorization settings in a computing environment, user access permissions are created or modified by mapping, granting, and/or limiting access to resources by resource type, and using checkboxes for controlling user access for individual resources and for mapping one of a multiplicity of icons to control a type of user access and control over the individual resources.

18 Claims, 4 Drawing Sheets

EFFICIENT MODIFICATION AND CREATION OF AUTHORIZATION SETTINGS FOR USER ACCOUNTS

BACKGROUND OF THE INVENTION

Field of the Invention

The present invention relates in general computing systems, and more particularly to, systems, computer program products, and methods for efficient modification and creation of authorization settings for user accounts in a computing system.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent reliability demands and while providing complex and sophisticated data storage systems.

The computing systems may include application/system administrators. The computing systems and applications administrators perform various tasks for computer systems (typically, servers). The system administrator may control a user's access to the resources of a computer system by assigning access rights to the user in a security system. Providing accesses to computing resources is a key problem to solve, and therefore, a need exists to for efficient modification and creation of authorization settings for user accounts of computing resources within the computer resources.

SUMMARY OF THE INVENTION

In one embodiment, a method is provided for efficient modification and creation of authorization settings for user accounts using at least one processor device in a computing environment. In one embodiment, by way of example only, the method creates and/or modifies user access permissions by mapping, granting, and/or limiting access to resources by resource type, and uses checkboxes for controlling user access for individual resources and for mapping of icons to control a type of user access and control over the individual resources.

In another embodiment, a computer system is provided for efficient modification and creation of authorization settings for user accounts using at least one processor device, in a computing environment. The computer system includes a computer-readable medium and a processor in operable communication with the computer-readable medium. In one embodiment, by way of example only, the processor propagates creates and/or modifies user access permissions by mapping, granting, and/or limiting access to resources by resource type, and uses checkboxes for controlling user access for individual resources and for mapping of icons to control a type of user access and control over the individual resources.

In a further embodiment, a computer program product is provided for efficient modification and creation of authorization settings for user accounts using at least one processor device, in a computing environment. The computer-readable storage medium has computer-readable program code portions stored thereon. The computer-readable program code portions include a first executable portion that creates and/or modifies user access permissions by mapping, granting, and/or limiting access to resources by resource type, and uses checkboxes for controlling user access for individual resources and for mapping of icons to control a type of user access and control over the individual resources.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As the impact of the Internet continues to alter the economic landscape, companies are experiencing a fundamental shift in how they do business. Business processes involve complex interactions between companies and their customers, suppliers, partners, and employees. Conventional service and network administration systems control external access to services with an authentication, access control, or gateway device at the edge of an internal network, such that the gateway device resides between the servers that provide a given service, and the clients that utilize that service. As used herein, the term "server" refers generally to one or more computer systems that work individually or cooperatively to provide a service to client devices.

It has done so by providing protocols and addressing schemes which make it possible for any computer system anywhere in the world to exchange information with any other computer system anywhere in the world, regardless of the computer system's physical hardware, the kind of physical network it is connected to, or the kinds of physical networks that are used to send the information from the one computer system to the other computer system. The very ease with which computer systems may exchange information and granted access to a variety of computing resources creates various challenges.

For example, a system administrator may control a user's access to the resources of a computer system by assigning access rights to the user in a security system. Prior to authorizing a user to access a resource, previous access management systems may authenticate a user. That is, the identity of the user is verified. After a user is successfully authenticated for a first protected resource, the user may request access to a second resource. If the second resource is also protected, the user may be required to perform a second authentication for the second resource. However, it may be redundant to force the user to re-authenticate for the second resource, especially if the previous authentication occurred relatively recently. Requiring repetitive re-authentications can unduly burden both user and networks, causing reductions in productivity and degradations in network performance. Providing accesses to computing resources is a key problem to solve, and therefore, a need exists to for efficient modification and creation of authorization settings for user accounts of computing resources within the computer resources. Thus, in one embodiment, system administrators create and/or modify the authorization settings of users or groups of users (e.g., user access permissions) in a quick and straightforward manner. Authorization settings include the commands a user is allowed to execute, the list of resources they are allowed to execute these commands on, and the list of resources they are allowed to view.

In one embodiment, by way of example only, user access permissions are created or modified by mapping, granting, and/or limiting access to resources by resource type, and using checkboxes for controlling user access for individual resources and for mapping of icons to control a type of user access and control over the individual resources. More specifically, a security manager maps, grants, and/or limits access to resources by the type of resource, and/or uses checkboxes (e.g., checks the checkboxes) to control user access to individual resources, and to map icons to control the type of user access and control over the individual resources. Also, the present invention provides several functional apparatus that allows a user to assign permissions to other users to view and/or modify resources on the system.

In one embodiment, a functional apparatus consists of 3 parts that interact to fully customize the authentication for the user. The 3 interactive parts include at least 1) a function access controller, 2) a resource selector, and 3) an action access controller. The function access controller allows administrators to specify which resource types a user can view or modify. The resource selector allows administrators to specify what resources a user can interact with. The action access controller allows administrators to specify what actions a user can perform.

A security administrator uses the function access controller, the resource selector, and the action access controller by creating a "role" (e.g., a user role) and then opens each apparatus (e.g., function access controller, a resource selector, and an action access controller) individually to change a particular aspect of the function access controller, a resource selector, and/or an action access controller. Users are then assigned a role and therefore inherit the particular attributes set in each apparatus.

In one embodiment, for example, the function access controller lists a high-level description of all resource types supported in a graphical user interface (GUI). The resource types map to specific pages in the GUI. There are at least 3 icons that indicate the status that can be specified for the resource type. The 3 icons include: 1) a no access, 2) a no modification icon, and 3) a full modification icon. The application/system administrator selects one of three icons by clicking in a corresponding column in the table. The function access controller provides for quick sorting based on the resource type or the permissions. Modification of user access permissions require only a one-click modification of the permissions for the given resource type. Also, multiple resource types may be simultaneously modified with a single key press. The function access controller provides for clicking and dragging the mouse cursor within the table to set several permissions, and also copying the user access permissions for a specific resource type and pasting the user access permissions into the into another user's access permissions.

In one embodiment, for example, the resource selector lists all of the resources of the selected resource type that are defined on the computing system. In one embodiment, a checkbox is provided next to each resource (e.g., such as a logical library). If a user selects the checkbox (via a GUI interface/GUI pages), the user will be able to view and modify the resource. If a resource is not selected, the user will not be able to see that resource in the GUI pages that the user has access to. This selection of the checkbox allows for configuring multi-tenancy for computing systems that have users from multiple organizations. User access permissions are limited based on membership of the resources.

In one embodiment, for example, the action access controller lists all of the actions that can be performed on a GUI page. There are at least 3 icons that indicate the status that can be specified for the each action: 1) a no modification icon, 2) a modification icon, and 3) an administrator approval required icon. Actions may be anything that a user can perform against a resource such as renaming, copying or customizing the settings of the resource. The system administrators are therefore allowed to define separate user roles when ensuring segregation of duties for compliance such as financial, medical and government regulations.

The action access controller allows for collapsible and expandable GUI page titles that can show and/or hide the list of actions for that page, which is useful for long lists of actions. The action access controller allows for one-click modification of the permissions for the given resource type. The action access controller allows for clicking and dragging the mouse cursor within the table to set several permissions in a column, and also allows for copying the permissions for a specific GUI page and pasting the user access permissions into the user access permission of another GUI page. System administrators are notified so they can approve of any changes to the system.

It should be noted the checking of the checkboxes is not checking of the user access permissions, but rather, the means for creating a permission profile for each user. Also, when defining the user access permissions, the systems administrator is selecting the actual GUI pages and the resource groups (e.g., logical libraries) that each user has access too. Thus, the present invention summarizes the actual system resources so the systems administrator may select resources rather than just see a visualization of the policy server database. In one embodiment, the present invention creates users and defines which GUI pages and objects the user is able to view.

Figure 1:
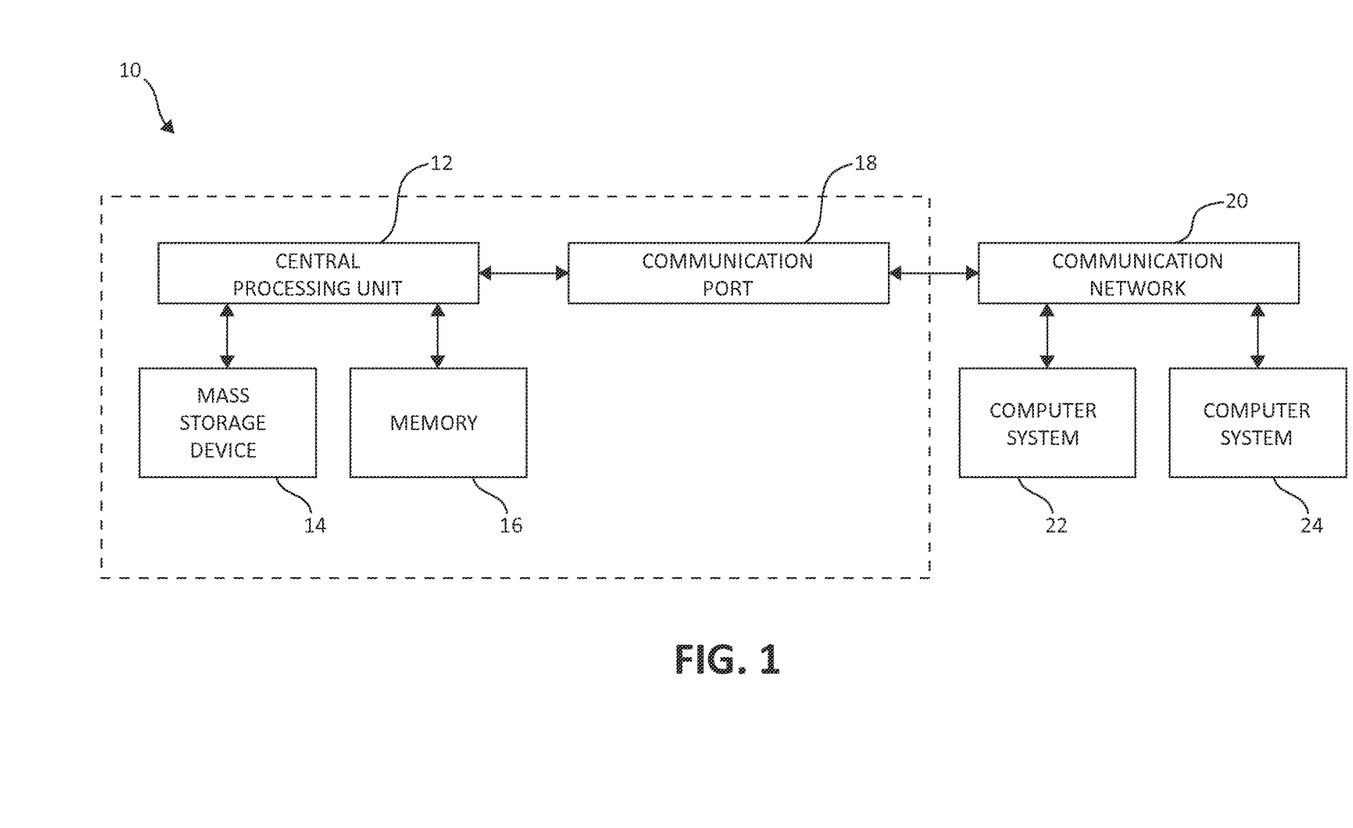
FIG. 1 is a block diagram illustrating a computing system environment having an example storage device in which aspects of the present invention may be realized.

Turning now to FIG. 1, exemplary architecture 10 of a computing system environment is depicted. It should be noted that the embodiments described herein may apply to a computing storage environment and/or apply to all types of computing environments. The reference to a computing storage environment, as described herein, is for illustration purposes and/or for providing an example of a computing environment in which the present invention may be applied. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
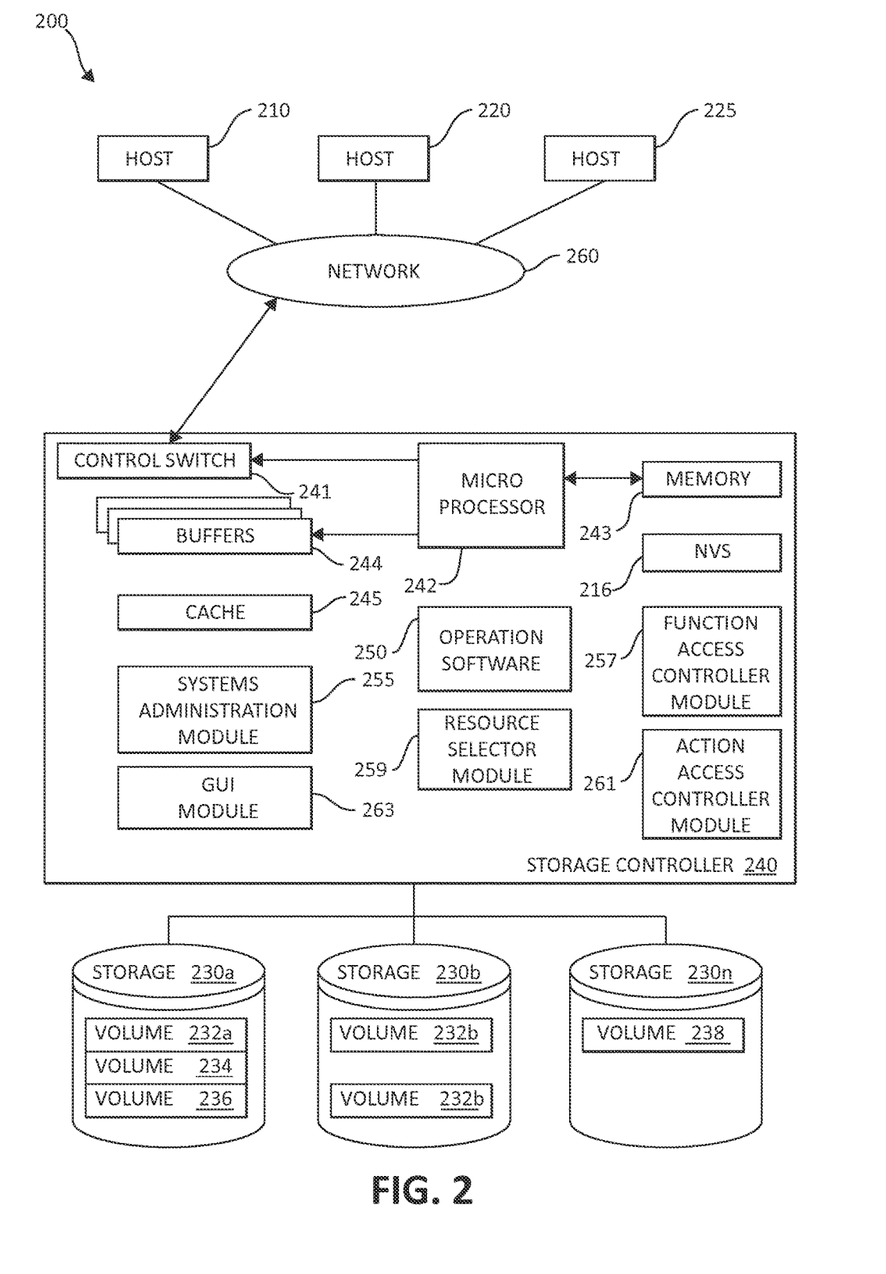
FIG. 2 is a block diagram illustrating a hardware structure of data system in a computer system in which aspects of the present invention may be realized.

FIG. 2 is an exemplary block diagram 200 showing a hardware structure of a data system in a computer system according to the present invention. Host computers 210, 220, 225, are shown, each acting as a central processing unit for performing data processing as part of a data storage system 200 (e.g., a data storage system). The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a systems administration module 255, a function access controller module 257, a resource selector module 259, an action access controller module 261, and a GUI module 263. The systems administration module 255, the function access controller module 257, the resource selector module 259, the action access controller module 261, and the GUI module 263 may work in conjunction with each and every component of the storage controller 240, the hosts 210, 220, 225, and storage devices 230. The systems administration module 255, the function access controller module 257, the resource selector module 259, the action access controller module 261, and the GUI module 263 may be structurally one complete module or may be associated and/or included with other individual modules. The systems administration module 255, the function access controller module 257, the resource selector module 259, the action access controller module 261, and the GUI module 263 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the systems administration module 255, the function access controller module 257, the resource selector module 259, the action access controller module 261, and the GUI module 263, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the systems administration module 255, the function access controller module 257, the resource selector module 259, the action access controller module 261, and the GUI module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the systems administration module 255, the function access controller module 257, the resource selector module 259, the action access controller module 261, and the GUI module 263, may also be located in the cache 245 or other components. As such, one or more of the systems administration module 255, the function access controller module 257, the resource selector module 259, the action access controller module 261, and the GUI module 263, maybe used as needed, based upon the storage architecture and users preferences.

Figure 3:
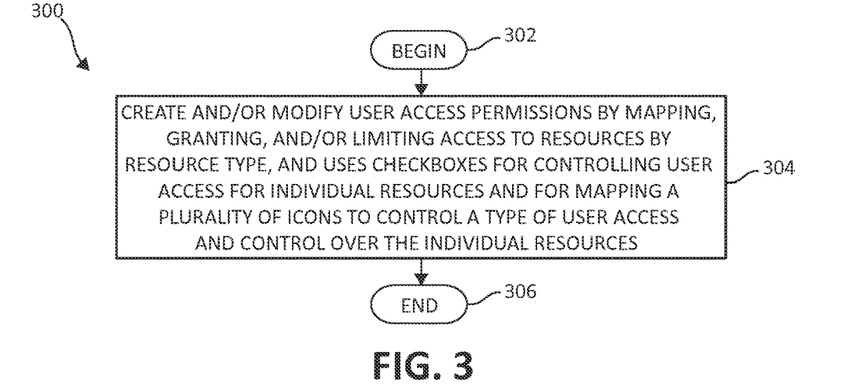
FIG. 3 is a flowchart illustrating an exemplary method for efficient modification and creation of authorization settings for user accounts in which aspects of the present invention may be realized.

FIG. 3 is a flowchart illustrating an exemplary method 300 for efficient modification and creation of authorization settings for user accounts in which aspects of the present invention may be realized. The method 300 begins (step 302) by creating and/or modifying user access permissions by mapping, granting, and/or limiting access to resources by resource type, and uses checkboxes for controlling user access for individual resources and for mapping one of a multiplicity of icons to control a type of user access and control over the individual resources (step 304). The method 300 ends (step 306).

Figure 4:
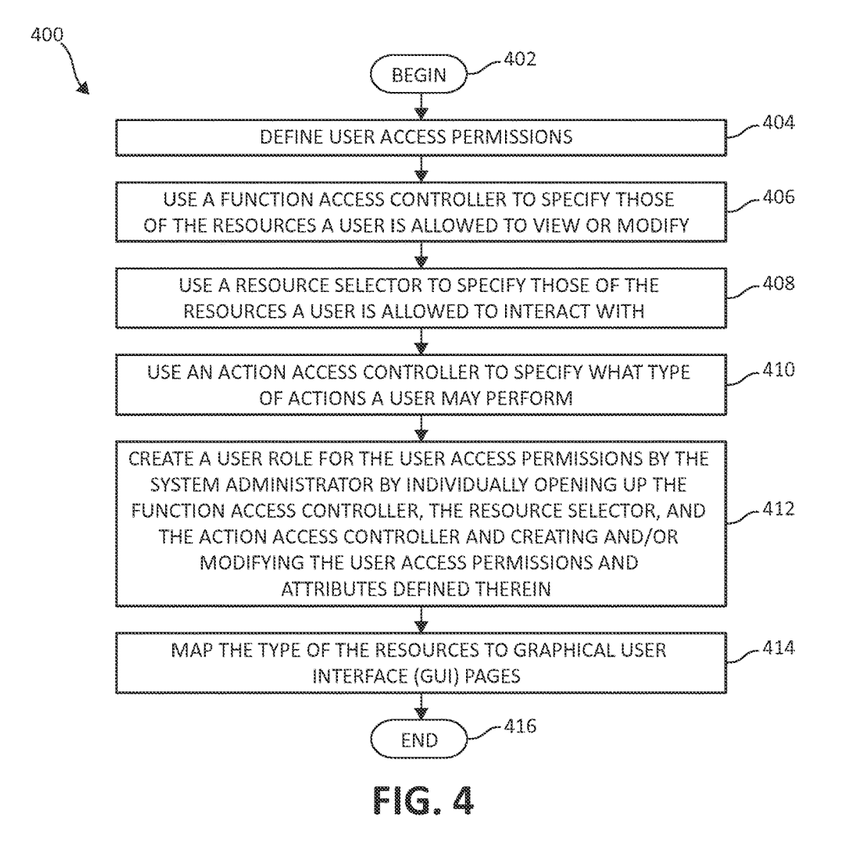
FIG. 4 is a flowchart illustrating an additional exemplary method for efficient modification and creation of authorization settings for user accounts in which aspects of the present invention may be realized.

FIG. 4 is a flowchart illustrating an additional exemplary method 400 for efficient modification and creation of authorization settings for user accounts in which aspects of the present invention may be realized. The method 400 begins (step 402) by defining user access permissions (step 404). Defining the user access permissions included defining at least a type of command a user is allowed to execute, a list of the plurality of resources the user is allowed to execute the commands on, and a list of the plurality of resources the user is allowed to view, and/or defining the user access permissions by selecting graphical user interface (GUI) pages and a group of the plurality of resources that each user has access to. The resources are summarized for selection.

The method 400 uses a function access controller to specify those of the resources a user is allowed to view or modify (step 406). The method 400 uses a resource selector to specify those of the resources a user is allowed to interact with (step 408). The method 400 uses an action access controller to specify what type of actions a user may perform (step 410). The method 400 creates a user role for the user access permissions by the system administrator by individually opening up the function access controller, the resource selector, and the action access controller and creating and/or modifying the user access permissions and attributes defined therein (step 412). The user role inherits the attributes of each one of the function access controller, the resource selector, and the action access controller based upon selected or modified criteria. The method 400 maps the type of the resources to graphical user interface (GUI) pages (step 414). The method 400 ends (step 416).

Figure 5:
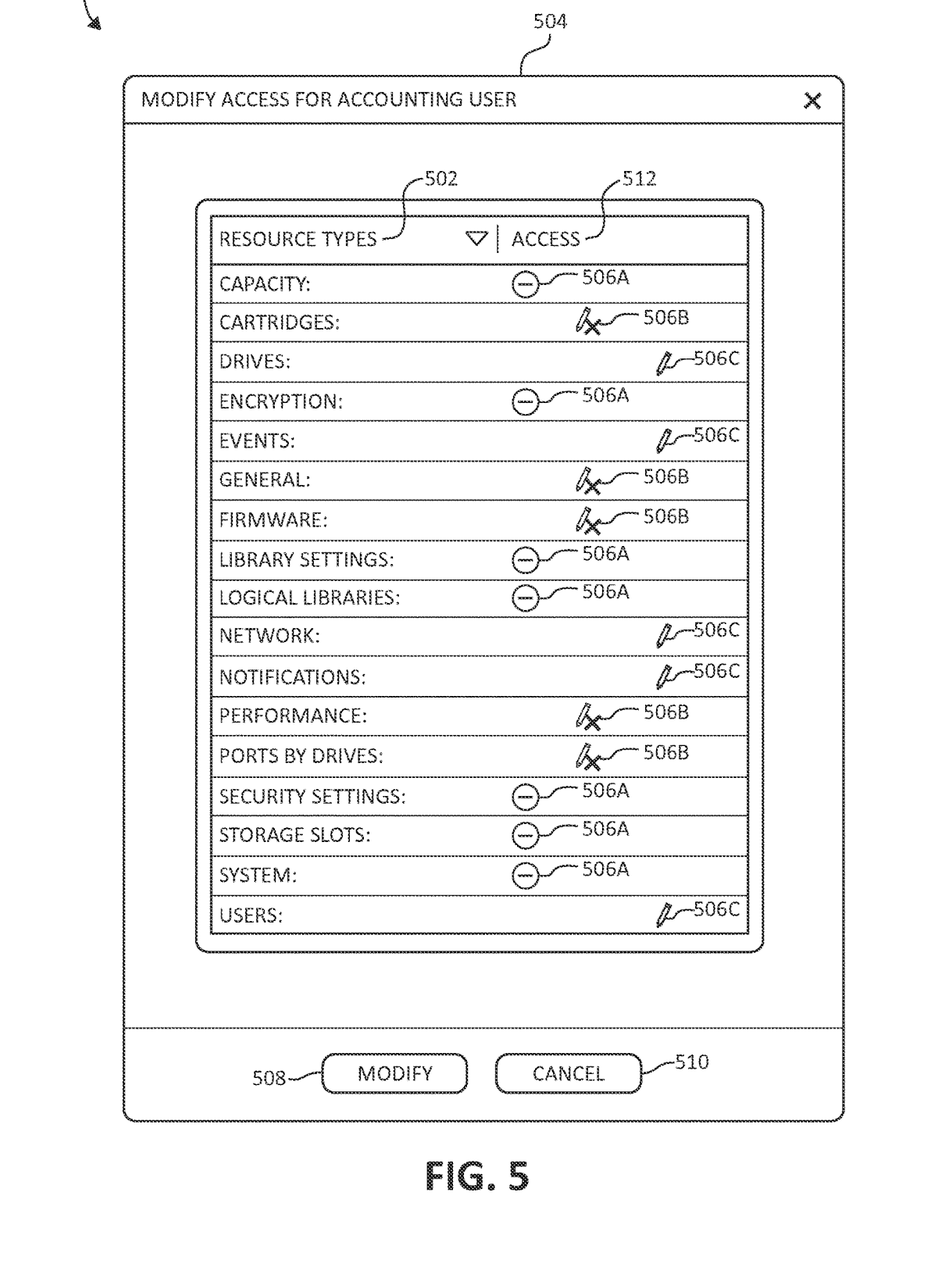
FIG. 5 is a block diagram illustrating a hardware structure for efficient modification and creation of authorization settings for user accounts in which aspects of the present invention may be realized.

FIG. 5 is a block diagram 500 illustrating a hardware structure for efficient modification and creation of authorization settings for user accounts in which aspects of the present invention may be realized. In one embodiment, for example, the function access controller lists a high-level description of all resource types 502 supported in a graphical user interface (GUI) 504. The resource types map to specific pages in the GUI. There are at least 3 icons 506 (illustrated as 506A-C) that indicate the status (e.g., access status) that can be specified for the resource type: 1) a no access 506A, 2) a no modification icon 506B, and 3) a full modification 506C icon. There may also be a selection button for modifying 508 and/or canceling 510. The application/system administrator selects one of three icons 506 by clicking in the corresponding column 512 in the table. The function access controller provides for quick sorting based on the resource type or the permissions. Modification of user access permission only require a one-click modification of the permissions for the given resource type 502. Also, multiple resource types may be simultaneously modified with a single key press. The function access controller provides for clicking and dragging the mouse cursor within the table to set several permissions, and also copying the user access permissions for a specific resource type and pasting the user access permissions into the into another user's access permissions. In one embodiment, the resource types may include, amongst other types of resources which may not be listed in FIG. 5, capacity, cartridges, drives, encryption, events, general, firmware, library settings, logical libraries, networks, notifications, performance, ports by drives, security settings, storage slots, system, and/or users.

In one embodiment, the present invention provides for efficient modification and creation of authorization settings for user accounts using at least one processor device in a computing environment. In one embodiment, by way of example only, the method creates and/or modifies user access permissions by mapping, granting, and/or limiting access to resources by resource type, and uses checkboxes for controlling user access for individual resources and for mapping of icons to control a type of user access and control over the individual resources.

In one embodiment, the present invention performs at least one of: defining the user access permissions to include at least a type of command a user is allowed to execute, a list of the resources the user is allowed to execute the commands on, and a list of the resources the user is allowed to view, and defining the user access permissions by selecting graphical user interface (GUI) pages and a group of the resources that each user has access to, wherein the plurality of resources are summarized for selection.

In one embodiment, the present invention performs at least one of 1) allowing a system administrator to specify those of the plurality of resources a user is allowed to view or modify, 2) allowing a system administrator to specify those of the plurality of resources a user is allowed to interact with, and 3) allowing a system administrator to specify what type of a plurality of actions a user may perform.

In one embodiment, the present invention creates a user role for the user access permissions by the system administrator by individually opening up each one of the function access controller, the resource selector, and the action access controller and creating or modifying the user access permissions and attributes defined therein. The user role inherits the attributes of each one of the function access controller, the resource selector, and the action access controller based upon selected or modified criteria.

In one embodiment, the present invention maps the type of the plurality of resources to graphical user interface (GUI) pages. In one embodiment, the present invention performs at least one of: 1) using the icons for indicating a status that can be specified for the type of the resources, 2) using the icons for indicating a status that can be specified for each of the actions. The actions include at least renaming, copying, and customizing settings of the plurality of actions, moving the multiplicity of icons to one of a plurality of positions for setting the access to the type of the plurality of resources, and/or selecting the checkboxes next to each of the plurality of resources for one of viewing and modifying each of the plurality of resources.

In one embodiment, the present invention a user to assign user access permissions to an alternative user to view or modify the resources.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient authorization settings using at least one processor in a computing environment, the method comprising:

creating or modifying user access permissions, by a system administrator executing the at least one processor, by a mapping, granting, and limiting access to a plurality of resources by a type of the plurality of resources using a permission profile created for each user by the system administrator, the permission profile displayed within a single interface;

using checkboxes for controlling user access for individual resources of the plurality of resources and for mapping a plurality of icons to display a type of user access and control a particular user has over the individual resources within the permission profile created for each user; wherein the user access permissions are defined to include at least a type of command a user is allowed to execute, a list of the plurality of resources the user is allowed to execute the commands on, and a list of the plurality of resources the user is allowed to view such that the user access permissions are created or modified by the system administrator to grant and limit access to each of the respective plurality of resources the user is authorized to access and control in one step within the permission profile of the single interface, in lieu of granting and limiting access to each of the respective plurality of resources to the user on an individual basis within multiple respective interfaces associated with respective ones of the plurality of resources;

using the plurality of icons for indicating a status specified for the type of the plurality of resources;

using the plurality of icons for indicating a status specified for each of a plurality of actions, wherein the plurality of actions include at least renaming, copying, and customizing settings of the plurality of actions;

moving the plurality of icons to one of a plurality of positions for setting the access to the type of the plurality of resources; and selecting the checkboxes next to each of the plurality of resources for one of viewing and modifying each of the plurality of resources; wherein the system administrator grants and limits access to each of the plurality of resources the user is authorized to access and control in the one step by creating the permission profile within the single interface using the selected checkboxes associated with access to the individual resources of the plurality of resources and using the plurality of icons to control the type of user access to each of the individual resources of the plurality of resources authorized to the user at a single time.

2. The method of claim 1, further including defining the user access permissions by selecting graphical user interface (GUI) pages and a group of the plurality of resources that each user has access to, wherein the plurality of resources are summarized for selection.

3. The method of claim 2, further including performing at least one of:
   allowing a system administrator to specify those of the plurality of resources a user is allowed to view or modify,
   allowing a system administrator to specify those of the plurality of resources a user is allowed to interact with, and
   allowing a system administrator to specify what type of a plurality of actions a user may perform.

4. The method of claim 3, further including creating a user role for the user access permissions by the system administrator by individually opening up each one of a function access controller, a resource selector, and an action access controller and creating or modifying the user access permissions and attributes defined therein, wherein the user role inherits the attributes of each one of the function access controller, the resource selector, and the action access controller based upon selected or modified criteria.

5. The method of claim 4, further including mapping the type of the plurality of resources to graphical user interface (GUI) pages.

6. The method of claim 1, further including allowing one of a system administrator and a user to assign permissions to an alternative user to view or modify the plurality of resources.

7. A system for efficient authorization settings in a computing environment, the system comprising:
   a memory device storing instructions; and
   at least one processor device operable in the computing environment executing the instructions stored in the memory device, wherein the at least one processor device, when executing the instructions:
   creates or modifies user access permissions, by a system administrator, by mapping, granting, and limiting access to a plurality of resources by a type of the plurality of resources using a permission profile created for each user by the system administrator, the permission profile displayed within a single interface;
   uses checkboxes for controlling user access for individual resources of the plurality of resources and for mapping a plurality of icons to display a type of user access and control a particular user has over the individual resources Within the err permission profile created for each user; wherein the user access permissions are defined to include at least a type of command a user is allowed to execute, a list of the plurality of resources the user is allowed to execute the commands on, and a list of the plurality of resources the user is allowed to view such that the user access permissions are created or modified by the system administrator to grant and limit access to each of the respective plurality of resources the user is authorized to access and control in one step within the permission profile of the single interface in lieu of granting and limiting access to each of the respective plurality of resources to the user on an individual basis within multiple respective interfaces associated with respective ones of the plurality of resources,
   uses the plurality of icons for indicating a status specified for the type of the plurality of resources,
   uses the plurality of icons For indicating a status specified for each of a plurality of actions, wherein the plurality of actions include at least renaming, copying, and customizing settings of the plurality of actions,
   moves the plurality of icons to one of a plurality of positions for setting the access to the type of the plurality of resources, and
   selects the checkboxes next to each of the plurality of resources for one of viewing and modifying each of the plurality of resources the user is authorized to access and control in the one step by creating the permission profile within the single interface using the selected checkboxes associated with access to the individual resources of the plurality of resources and using the plurality of icons to control the type of user access to each of the individual recources of the plurality of resources authorized to the user at a single time.

8. The system of claim 7, wherein the at least one processor device defines the user access permissions by selecting graphical user interface (GUI) pages and a group of the plurality of resources that each user has access to, wherein the plurality of resources are summarized for selection.

9. The system of claim 8, further including:
   a function access controller, using the at least one processor device, allows a system administrator to specify those of the plurality of resources a user is allowed to view or modify,
   a resource selector, using the at least one processor device, allows a system administrator to specify those of the plurality of resources a user is allowed to interact with, and
   an action access controller, using the at least one processor device, allows a system administrator to specify what type of a plurality of actions a user may perform.

10. The system of claim 9, wherein the at least one processor device creates a user role for the user access permissions by the system administrator by individually opening up each one of a function access controller, a resource selector, and an action access controller and creating or modifying the user access permissions and attributes defined therein, wherein the user role inherits the attributes of each one of the function access controller, the resource selector, and the action access controller based upon selected or modified criteria.

11. The system of claim 10, wherein the at least one processor device maps the type of the plurality of resources to graphical user interface (GUI) pages.

12. The system of claim 7, wherein the at least one processor device allows one of a system administrator and a user to assign permissions to an alternative user to view or modify the plurality of resources.

13. A computer program product for efficient authorization settings in a computing environment, the computer program product comprising a non-transitory computer-readable storage medium having computer-readable program code portions stored therein, that when executed by at least one processor device:
   creates or modifies user access permissions by mapping, granting, and limiting access to a plurality of resources by a type of the plurality of resources using a permission profile created for each user by the system administrator, the permission profile displayed within a single interface;
   uses checkboxes for controlling user access for individual resources of the plurality of resources and for mapping a plurality of icons to display a type of user access and control a particular user has over the individual resources within the permission profile created for each user; wherein the user access permissions are defined to include at least a type of command a user is allowed to execute, a list of the plurality of resources the user is allowed to execute the commands on, and a list of the plurality of resources the user is allowed to view such that the user access permissions are created or modified by the system administrator to grant and limit access to each of the respective plurality of resources the user is authorized to access and control in one step within the permission profile of the single interface, in lieu of granting and limiting access to each of the respective plurality of resources to the user on an individual basis within multiple respective interfaces associated with respective ones of the plurality of resources;

uses the plurality of icons for indicating a status specified for the type of the plurality of resources;

uses the plurality of icons for indicating a status specified for each of a plurality of actions, wherein the plurality of actions include at least renaming, copying, and customizing settings of the plurality of actions;

moves the plurality of icons to one of a plurality of positions for setting the access to the type of the plurality of resources; and selects the checkboxes next to each of the plurality of resources for one of viewing and modifying each of the plurality of resources; wherein the system administrator grants and limits access to each of the plurality of resources the user is authorized to access and control in the one step by creating the permission profile within the single interface using the selected checkboxes associated with access to the individual resources of the plurality of resources and using the plurality of icons to control the type of user access to each of the individual resources of the plurality of resources authorized to the user at a single time.

14. The computer program product of claim 13, further including computer-readable program code that, when executed by the at least one processor device defines the user access permissions by selecting graphical user interface (GUI) pages and a group of the plurality of resources that each user has access to, wherein the plurality of resources are summarized for selection.

15. The computer program product of claim 14, further including computer-readable program code that, when executed by the at least one processor device performs at least one of:
    allowing a system administrator to specify those of the plurality of resources a user is allowed to view or modify,
    allowing a system administrator to specify those of the plurality of resources a user is allowed to interact with, and
    allowing a system administrator to specify what type of a plurality of actions a user may perform.

16. The computer program product of claim 15, further including computer-readable program code that, when executed by the at least one processor device creating a user role for the user access permissions by the system administrator by individually opening up each one of a function access controller, a resource selector, and an action access controller and creating or modifying the user access permissions and attributes defined therein, wherein the user role inherits the attributes of each one of the function access controller, the resource selector, and the action access controller based upon selected or modified criteria.

17. The computer program product of claim 16, further including computer-readable program code that, when executed by the at least one processor device maps the type of the plurality of resources to graphical user interface (GUI) pages.

18. The computer program product of claim 13, further including computer-readable program code that, when executed by the at least one processor device allows one of a system administrator and a user to assign permissions to an alternative user to view or modify the plurality of resources.

* * * * *